Aug. 26, 1969  E. L. HELTON  3,463,521
LOCK MECHANISM FOR TELESCOPIC MEMBERS
Filed May 20, 1968  2 Sheets-Sheet 1
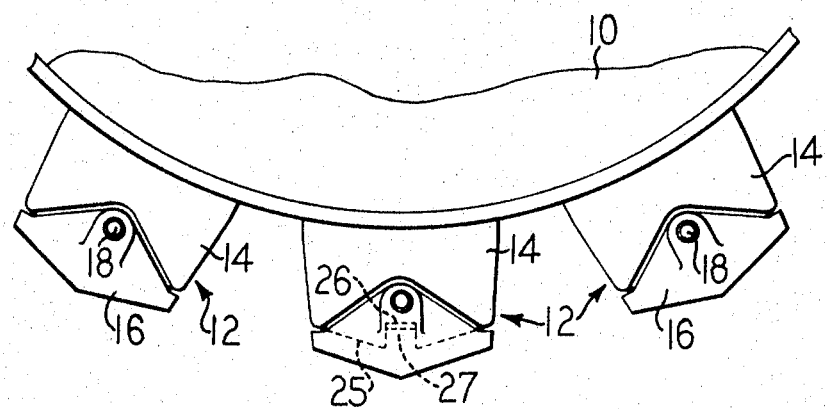
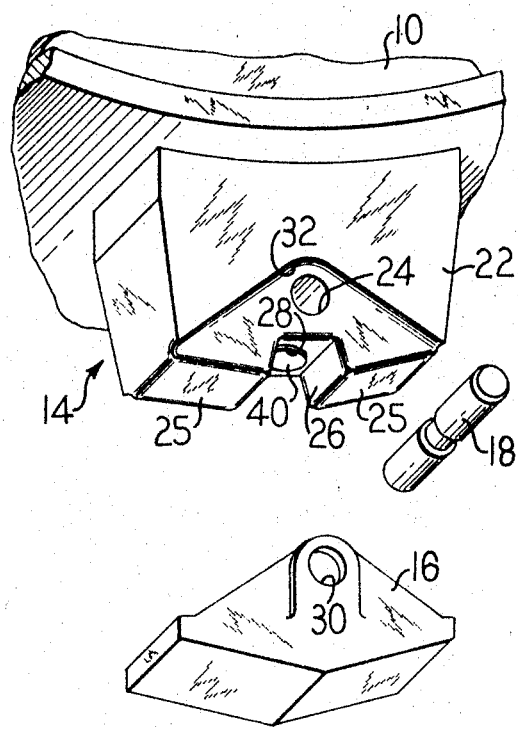
INVENTOR
EUGENE L. HELTON
BY
*Fryer, Tjensvold, Feix, Phillips & Lempio*
ATTORNEYS

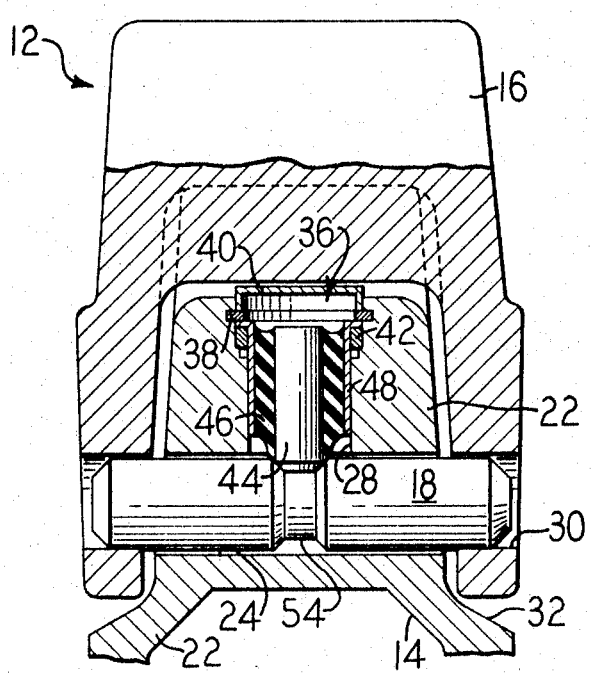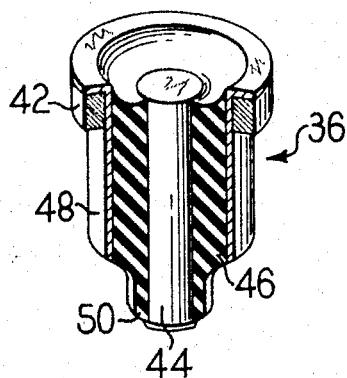

United States Patent Office 3,463,521
Patented Aug. 26, 1969

3,463,521
LOCK MECHANISM FOR TELESCOPIC MEMBERS
Eugene L. Helton, Peoria, Ill., assignor to Caterpillar
Tractor Co., Peoria, Ill., a corporation of California
Filed May 20, 1968, Ser. No. 730,529
Int. Cl. F16c *11/10*
U.S. Cl. 287—100                                     4 Claims

ABSTRACT OF THE DISCLOSURE

A locking mechanism for retaining two elements in telescopic relationship employs a replaceable resilient locking device which engages a groove of a retainer pin in a manner such that the telescopic elements may be easily assembled and disassembled but whereby slight accidental movements of the retainer pin will not disengage the locking device from the groove of the retainer pin.

Background of the invention

This invention relates to a locking mechanism or retention means for retaining two elements in telescopic relationship. The invention is particularly applicable to retention means for the tips of tamping devices, bucket tooth points, ripper tips and the like.

While the invention will be described primarily with reference to a tamping device it is to be understood that the invention has equal application in the retention of almost any type of telescoping members.

Many types of earth digging and compacting implements, such as tamping devices, have tips or points which must be periodically replaced due to normal wear and abrasion. It is desirable that the retaining means for the tips positively retain the replaceable tips yet permit easy replacement when they become worn out or broken.

It is also desirable that the retention means urge the tip into engagement with its support pedestal or shank in order to prevent undue rattling of the tip and wear on the pedestal when the tamping device is in operation.

Most prior art locking mechanisms or retainers employ a retainer pin extending through aligned bores provided in the tip and pedestal. The retainer pin is generally held in position by means of a compressed rubber member which biases the pin into a locked position.

One of the problems with such prior art devices is that the compressed rubber tends to take a permanent set, losing its resiliency and thereby becomes relatively ineffective in retaining the pin in the aligned bores. Also, in such prior art devices, a small lateral movement of the retaining pin (which may occur accidentially by rocks or other material acting on the ends of the pin) often results in unlocking of the locking mechanism allowing the retainer pin to work its way out with resultant loss of the tip. It is also desirable to provide a lock mechanism for such devices which will effectively prevent dirt and other material from interfering with the operation of the lock mechanism.

In view of the above, it is the principal object of the present invention to provide a locking mechanism for telescopic elements which will positively retain the elements, prevent rattle and wear between them, prevent any elastomeric components from taking an excessive permanent set and eliminate the problem of side loads on the retainer pin tending to accidentally unlock the retention device.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Brief description of the drawings

FIG. 1 is a side elevation of a tamping device shown mounted on a fragmentary portion of a compacting wheel;

FIG. 2 is an enlarged disassembled perspective of the tamping device of FIG. 1;

FIG. 3 is a sectional view showing the details of construction of the locking mechanism of the present invention; and FIG. 4 is a perspective view with parts broken away to illustrate the elements and construction of the locking mechanism of the present invention.

Description of the preferred embodiment

The lock mechanism of the present invention will now be described with respect to an exemplary environment wherein it has demonstrated particular utility. However, it should be understood that the invention is not limited to the environment shown in the accompanying drawings and could be utilized in almost any application wherein a retainer pin is used to fasten one element to another element.

Referring now to FIG. 1 there is shown a fragmentary portion of a compacting wheel designated by the numeral 10 on the periphery of which are mounted, in circumferentially spaced relation, tamping devices 12. The tamping devices comprise a generally pyramidal shaped member 14 secured, preferably by welding, to the peripheral surface of the compacting wheel 10. This member 14 has a smaller projecting pyramidal portion upon which is releasably mounted a replaceable tamping foot 16. The tamping foot 16 is hollow in form and is shaped to receive the projecting pyramidal shaped portion of the member 14 and is held in the position shown in FIG. 1 by retaining member 18, which is in the form of a pin extending through axially aligned bores in the tamping foot and in the projecting portion of the base member 14.

As shown in FIG. 2 the member 14 includes a projecting pyramidal portion 22 of reduced dimensions through which is formed a hole 24 for receiving the retaining member 18. The portion 22 has a generally flat end wall formed by two flat surfaces 25 projecting toward each other at a slight angle. A counter bore or slot 26 is provided at the apex of the end surfaces 25 for freely receiving a short boss (dowel) 27 formed on the interior of the tamping foot 16 (see FIG. 1). Another hole 28, located on an axis substantially normal to the axis of the hole 24, is formed in the base of counter bore 26 and this hole communicates with the hole 24 (see FIG. 3).

The tamping foot 16 is formed with a hollow interior being of substantially the same shape as the projecting portion 22 and of sufficient depth to completely shroud or enclose the portion 22. The inside dimensions of the hollow interior of the foot are greater than the dimensions of the projecting pyramidal portion so that the foot is supported solely on the end walls or surfaces 25 when assembled thereon. Tamping foot 16 has bores 30 formed in opposite walls thereof for slidably receiving the pin member 18 in a fitted relationship.

When the tamping foot 16 is located in assembled relation relative to the portion 22 as shown in FIG. 1, the opposed outer surfaces of the foot define a continuation of the surfaces of the member 14; however, the inner edges of the foot 16 are located in slightly spaced relation to a surface 32 which defines the transition zone between the projecting portion 22 and the tamping foot 16.

The interior surface of the tamping foot 16 and the surface of the portion 22 are formed generally similarly in shape as indicated by the section shown in FIG. 3. The tamping foot 16 is freely received on the portion 22 because of the oversize dimensions of the hollow interior in nonlocking relationship in order to achieve rapid assembly and disassembly. Becaue the foot is supported only on the end wall surfaces 25 (see FIG. 1) it is impossible for the foot to become wedged on the end of the projecting portion 22. However, the end wall surfaces of the portion 22 and those at the base of the tamping foot 16 are held in forceable engagement when the foot 16 and the portion 22 are in assembled relationship.

As shown in FIG. 3, a resilient locking mechanism generally indicated at 36 is retained in the bore 28 by a snap ring 38. A cap plug 40 is secured in the bore 28 in any suitable manner and closes the bore above the resilient locking mechanism 36 thereby preventing dirt and debris from entering the cavity which must be occupied by an elastomeric portion of the locker mechanism when it is deflected to its maximum position for removal of the pin 18. A spacer member 42 may be optionally provided in the stepped bore 28 so that the locking mechanism 36 may be adapted to fit into a variety of similar bores currently used in present production equipment. Through use of the spacer 42 the resilient locking mechanism 22 may be used as a direct replacement for present production items.

FIG. 4 is a perspective view with parts broken away in order to effectively show all of the elements of the resilient locking mechanism 36. As shown in FIG. 4 the locking mechanism 36 comprises a central pin 44 bonded in an elastomer of natural rubber or the like indicated at 46. The rubber elastomer 46 is in turn concentrically bonded to the inner surface of a tubular shell 48. It should be observed that the rubber elastomer 46 has a reduced diameter portion 50 which protrudes outside the tube 48 near one end of the central pin 44.

Referring back to FIG. 3 it should be noted that the pin 18 is provided with a groove 54 located substantially at its longitudinal mid-portion. With the telescoping parts in assembled relation the pin 44 of the locking mechanism 36 is received in the groove 54 and prevents longitudinal displacement of the pin 18 with respect to the aligned holes 24 and 30 formed in the respective telescoping parts. With the parts in assembly as shown in FIG. 3 the bias imparted by the resilient member 46 tends to force the pin 44 downwardly and by virtue of the closely fitting bores 24 and 30, the tip 12 is also urged downwardly onto the portion 22 since the pin 18 is free to move downwardly in the bore 24. As a result the tip 12 is urged into engagement with the portion 22 of the member 14 preventing rattle of the tip and undue wear between the telescoping members.

One of the advantages of the resilient locking mechanism 36 over prior art devices resides in the fact that the rubber elastomer 46 is not in a compressed condition when performing the locking function to prevent the pin 18 from being accidentally removed. This is an important advantage over many prior art devices because when a rubbery elastomer such as 46 is held under compression for a long period of time the rubber will tend to take a permanent set and thereafter it becomes almost impossible to remove the retaining pin 18 without damaging one or more of the components.

Another important advantage of the resilient locking mechanism 36 resides in the reduced diameter portion 50 of the rubber elastomer near one end of the pin 44. Thus, as shown in FIG. 3 when the locking mechanism 36 is in normal position with the parts in assembled relationship the bore 28 is not completely filled with elastomeric material 46 in the area closely adjacent to the retaining pin 18. Because of this unique structure slight longitudinal movement of the retaining pin 18 will only shift the pin 44 angularly and not immediately disengage it from the central groove 54 of the retainer pin 18. This is a very important feature of the invention and prevents any tendency for the pin 18 to unlock accidentally when struck by rocks or other objects while in use.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A locking mechanism for retaining two parts in telescopic relationship comprising:
    a retaining pin received in aligned bores formed in each of said parts;
    a groove formed in the retaining pin intermediate the ends thereof;
    a resilient locking assembly provided in one of the telescopically disposed parts;
    said locking assembly comprising a locking pin having a portion for normally engaging the groove in said retaining pin; and
    an encased, resilient elastomeric means disposed about said locking pin and secured to the inner wall of a tubular casing shell for engaging said groove, said elastomeric means having a reduced diameter portion surrounding substantially all of the protruding portion of said pin to permit sideways deflection of the lock pin without disengagement from the groove of the retainer pin when the retainer pin is subjected to slight movements.

2. A locking mechanism as set forth in claim 1 wherein the locking pin is disposed in the resilient elastomeric means such that movement of said lock pin introduces shear forces in the elastomer.

3. A locking mechanism as set forth in claim 1 wherein said resilient locking assembly urges said retaining pin into engagement with one of said parts to thereby urge said one part into telescopic engagement with said other part.

4. A resiliently acting, renewable cartridge for engaging the groove of a retainer pin to hold said retainer pin in a predetermined position, said cartridge comprising:
    a tubular casing shell;
    a resilient elastomer fixedly secured to the inner wall of said shell;
    a pin centrally located in and fixedly secured to said resilient elastomer;
    said pin protruding outwardly from one end of said shell for engagement with the groove formed in said retainer pin and said resilient elastomer having a reduced diameter portion surrounding substantially all of the protruding portion of said pin.

References Cited

UNITED STATES PATENTS

| 2,996,291 | 8/1961 | Krekeler | 299—92 |
| 3,092,374 | 6/1963 | Krekeler | 299—92 |
| 3,177,037 | 4/1965 | Elders | 299—92 |
| 3,188,756 | 6/1965 | Baer. | |

FOREIGN PATENTS

| 213,291 | 2/1958 | Australia. |
| 952,216 | 3/1964 | Great Britain. |

DAVID J. WILLIAMOWSKY, Primary Examiner

ANDREW V. KUNDRAT, Assistant Examiner

U.S. Cl. X.R.

37—142; 299—92